(12) United States Patent
Capuozzo et al.

(10) Patent No.: US 9,239,608 B2
(45) Date of Patent: Jan. 19, 2016

(54) DATA STREAM RESOURCE MANAGEMENT

(71) Applicant: Accenture Global Services Limited, Dublin (IE)

(72) Inventors: Giuseppe Capuozzo, Rome (IT); Orlando Onorato, Rome (IT); Donatella Enei, Rome (IT); Eli Komlan Dzah, Rome (IT)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 307 days.

(21) Appl. No.: 13/791,194

(22) Filed: Mar. 8, 2013

(65) Prior Publication Data

US 2014/0129861 A1    May 8, 2014

(30) Foreign Application Priority Data

Nov. 5, 2012 (EP) .................................... 12425179

(51) Int. Cl.
*G06F 1/32* (2006.01)
*H04N 21/443* (2011.01)
*H04N 21/6437* (2011.01)
(Continued)

(52) U.S. Cl.
CPC ............ *G06F 1/3234* (2013.01); *G06F 1/3206* (2013.01); *H04L 65/00* (2013.01); *H04L 65/1069* (2013.01); *H04L 65/4084* (2013.01); *H04L 65/4092* (2013.01); *H04N 21/4436* (2013.01); *H04N 21/6437* (2013.01); *H04N 21/6587* (2013.01)

(58) Field of Classification Search
CPC ............ H04L 65/4092; H04L 65/4084; H04L 65/1069

USPC .......... 725/131, 132; 709/231, 217; 715/810; 701/48; 345/619; 348/135; 455/415; 713/268

See application file for complete search history.

(56) References Cited

U.S. PATENT DOCUMENTS 8,423,658 B2 *    4/2013 Shatsky ........................ 709/231
2006/0256133 A1 *   11/2006 Rosenberg .................... 345/619
(Continued)

FOREIGN PATENT DOCUMENTS

WO    WO 2008/072093    6/2008

OTHER PUBLICATIONS

Extended European Search Report issued in EP Appln. No. 12425179.4 dated Apr. 10, 2013 (8 pgs).
(Continued)

*Primary Examiner* — Thomas Lee
*Assistant Examiner* — Aurel Prifti
(74) *Attorney, Agent, or Firm* — Brinks Gilson & Lione

(57) ABSTRACT

The present application relates to a computer implemented method, a computer program product and a computer system for controlling a data stream from a server computer to a client computer. The client computer comprises a data stream client and the server computer comprises a data stream server. While receiving, by the data stream client from the data stream server, the data stream, the method may comprise generating, by the client computer, a power management decrease event, receiving, by the data stream client, the power management decrease event, sending, from the data stream client to the data stream server, a first pause request to temporarily halt the data stream, and transitioning, by the client computer, from a fully working power state to a decreased power consumption state in response to the power management decrease event.

18 Claims, 8 Drawing Sheets

(51) Int. Cl.
*H04N 21/6587* (2011.01)
*H04L 29/06* (2006.01)

(56) References Cited

U.S. PATENT DOCUMENTS

| | | | | |
|---|---|---|---|---|
| 2007/0101392 | A1* | 5/2007 | Soin et al. | 725/132 |
| 2009/0094374 | A1* | 4/2009 | Lam | H04N 21/643 |
| | | | | 709/231 |
| 2010/0125890 | A1* | 5/2010 | Levine et al. | 725/131 |
| 2012/0159162 | A1* | 6/2012 | Chang | H04L 9/3213 |
| | | | | 713/168 |
| 2012/0209946 | A1* | 8/2012 | McClure et al. | 709/217 |
| 2012/0300061 | A1* | 11/2012 | Osman et al. | 348/135 |
| 2013/0024812 | A1* | 1/2013 | Reeves et al. | 715/810 |
| 2013/0066526 | A1* | 3/2013 | Mondragon et al. | 701/48 |
| 2013/0157631 | A1* | 6/2013 | Wang et al. | 455/415 |
| 2013/0176415 | A1* | 7/2013 | Kim et al. | 348/78 |

OTHER PUBLICATIONS

"*Advanced Configuration and Power Interface*", Wikipedia, the free encyclopedia, Nov. 14, 2011, XP055050204, Retrieved from the Internet: URL:http://en.wikipedia.org/w/index.php?title=Advanced_Configuration_and_Power_Interface&oldid=460583475 [retrieved on Jan. 18, 2013] (7 pgs).

"*Developments XMPlay Topic: Wishlist for XMPlay 3.2*", Un4seen Developments Forum, Sep. 16, 2004, XP002693942, Retrieved from the Internet: URL:http://www.un4seen.com/forum/?topic=3022.0 [retrieved on Mar. 14, 2013] (3 pgs).

"*Software dev help, standby resume issue playing live TV*", TheGreenButton, Dec. 3, 2011, XP002693943, Retrieved from the Internet: URL:http://www.thegreenbutton.tv/forum/viewtopic.php?f=5&t=1014 [retrieved on May 13, 2015] (3 pgs).

* cited by examiner

DATA STREAM RESOURCE MANAGEMENT

RELATED APPLICATIONS

This application claims priority to EPO Application No. 12 425 179.4, filed Nov. 5, 2012, the entirety of which is incorporated by reference herein.

TECHNICAL FIELD

The present application relates to a computer implemented method, a computer program product, and a computer system for controlling a data stream.

BACKGROUND OF THE INVENTION

Data streaming, particularly media streaming, is becoming more and more common. Services that provide data streaming make use of network resources. In particular, data streaming, particularly video streaming, consumes network bandwidth, data stream server processing power, and routing and switching resources.

Accordingly, it may be a problem to conserve network resources consumed by a data stream.

TECHNICAL DEFINITIONS

A data stream may be understood as a sequence of digitally coherent signals (e.g. data packets) used to transmit information. In some cases, a data stream may be transmitted in a continuous (or substantially continuous) manner from a server computer to a client computer. Also, the data stream may be continuously (or substantially continuously) received by the client computer.

The data stream may be implemented as a media stream, e.g. an audio, video, text stream. The data stream may be streamed live or on demand. Live streaming is also referred to as "true streaming". True streaming sends the information straight to the client computer without saving the file to a hard disk. On demand streaming may also be referred to as progressive streaming or progressive download. Progressive streaming may be implemented by saving a file to a hard disk and then playing the file stored on the hard disk. The content of the data stream may be processed or displayed by the client's computer before the entire data stream is sent or transmitted by the server computer. In other words, the client computer may process the data stream while it is being received.

The client computer (e.g. a data stream client of the client computer) may be the data stream sink and the server computer (e.g. a data stream server of the server computer) may be the data stream source. Thus, the server computer generates the data stream, sends it across a network (e.g. the Internet) in messages, and the sink processes the data stream as it arrives. In the example of a video stream, the server computer generates the video stream (e.g. using a video capture card), sends it across the network in messages, and the sink displays the video stream as it arrives.

The data stream may be transmitted in raw form, e.g. with a throughput rate of 75 Mbps. The data stream may also be compressed (i.e. transmitted using a codec or encoded), e.g. transmitted at an average rate of 2 Mbps.

The data stream may be sent using a unicast protocol or a multicast protocol. When using the multicast protocol, the server computer sends out a single data stream that is common to all client computers.

The data stream client (also referred to as the streaming client) may be implemented as a media player, such as the QuickTime (QuickTime is a trademark of Apple Corporation) player or the Winamp player. The data stream client may be understood as software that is executable on the client computer, and which is capable of processing the data stream.

The data stream server may be implemented as a streaming server, such as the QuickTime streaming server, Helix Universal Server, or Windows Media Services (Windows is a trademark of Microsoft Corporation).

A power state, or power consumption state may be understood according to the advanced configuration and power interface (ACPI) specification, the advanced power management (APM) specification or another standard or specification defining power management states.

A fully working power state may be understood as a state in which the corresponding computer is functional. The computer is powered on. Also, individual devices can be in low or decreased power consumption states. In addition, processors can be in low or decreased power states. Alternatively, the fully working power state can mean that no devices are in a power saving mode (i.e. no devices are in a decreased power state, a decreased power consumption state, or a low power state).

The terms "power state" and "power consumption state" are used interchangeably. A decreased power consumption state may also be referred to as a low power consumption state or a reduced power consumption state.

A power management event (also referred to as a system power management event), such as a power management decrease event or a power management increase event, may be generated by a computer's firmware or by the operating system of the computer. When generated by the computer's firmware, the power management event may be generated by the basic input/output system (BIOS) of the computer. There may be a causal relationship between power management events and power consumption of the computer. In particular, the power management event may be generated in view of a pending change in power consumption of the computer, or the power management event may be generated because a change in the power consumption of the computer has occurred. In addition, there may be a temporal relationship between power management events (also referred to as power management events) and power consumption of the computer. In particular, the power management event may be generated before a change in power consumption of the computer or after a change in power consumption of the computer.

The power management event may be triggered by a change in the power status of the computer, a change in the operational mode of a device or the computer, or a change in the value of a power setting. The power management event may be triggered by switching the computer to a sleep state, e.g. due to inactivity of the computer or because the user manually puts the computer to sleep, e.g. by hitting a sleep key.

Accordingly, it may be that a power management decrease event is generated because of a pending reduction in power consumption of the computer (e.g. the computer is transitioning from a fully working state to a sleeping state). Also, the power management decrease event may be generated before the change in power consumption of the computer, i.e. before a transition form a fully working power state to a decreased power consumption state.

The decreased power consumption state may also be referred to as a decreased power state, a low power state, or a reduced power state.

The power management increase event may be generated because of an increase in power consumption of the computer. Also, the power management increase event may be generated after an increase in power consumption of the computer. More specifically, the power management increase event may be generated after a transition from the decreased power consumption state to the fully working power state.

SUMMARY OF THE INVENTION

The subject matter described in the specification can be implemented as a method or as a system, possibly in the form of one or more computer program products. The subject matter described in the specification can be implemented in a data signal, or on a machine readable medium, where the medium is embodied in one or more information carriers, such as a CD-ROM, a DVD-ROM, a semiconductor memory, or a hard disk. Such a computer program product may cause a data processing apparatus to perform one or more operations described in the specification.

In addition, subject matter described in the specification can also be implemented as a system including a processor, and a memory coupled to the processor. The memory may include one or more programs to cause the processor to perform one or more of the methods described in the specification. Further subject matter described in the specification can be implemented using various machines.

Details of one or more implementations are set forth in the exemplary drawings and description below. Other features will be apparent from the description, the drawings, and from the claims.

DETAILED DESCRIPTION OF THE INVENTION

In the following text, a detailed description of examples will be given with reference to the drawings. It should be understood that various modifications to the examples may be made. In particular, elements of one example may be combined and used in other examples to form new examples.

In the context of the present description, the terms "first" and "second" are used to distinguish elements, e.g. requests, and are not meant to indicate a temporal relationship.

Figure 1:
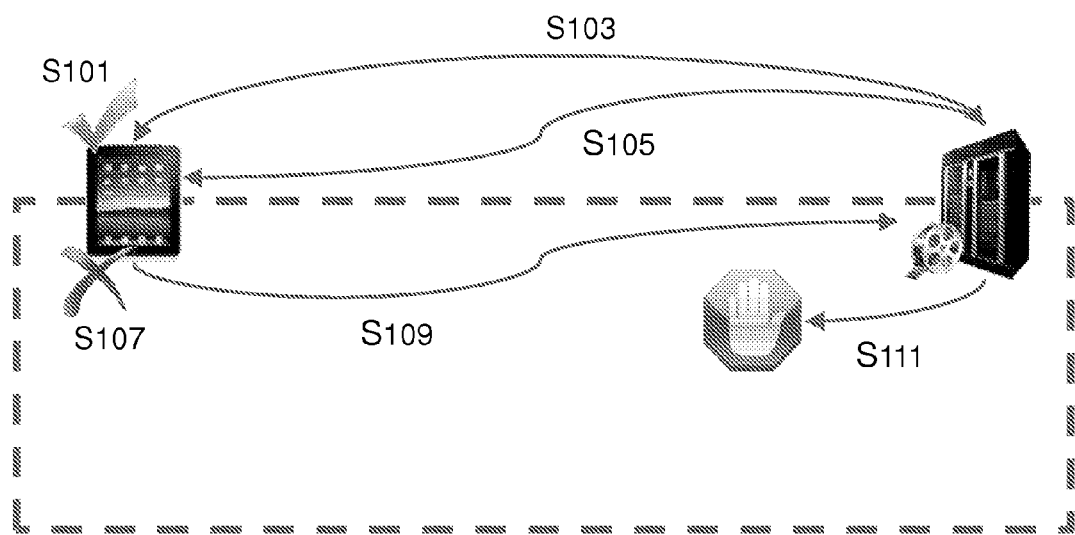
FIG. 1 illustrates an exemplary method for controlling a data stream.

FIG. 1 shows an exemplary implementation of a method for controlling a data stream.

Figure 2:
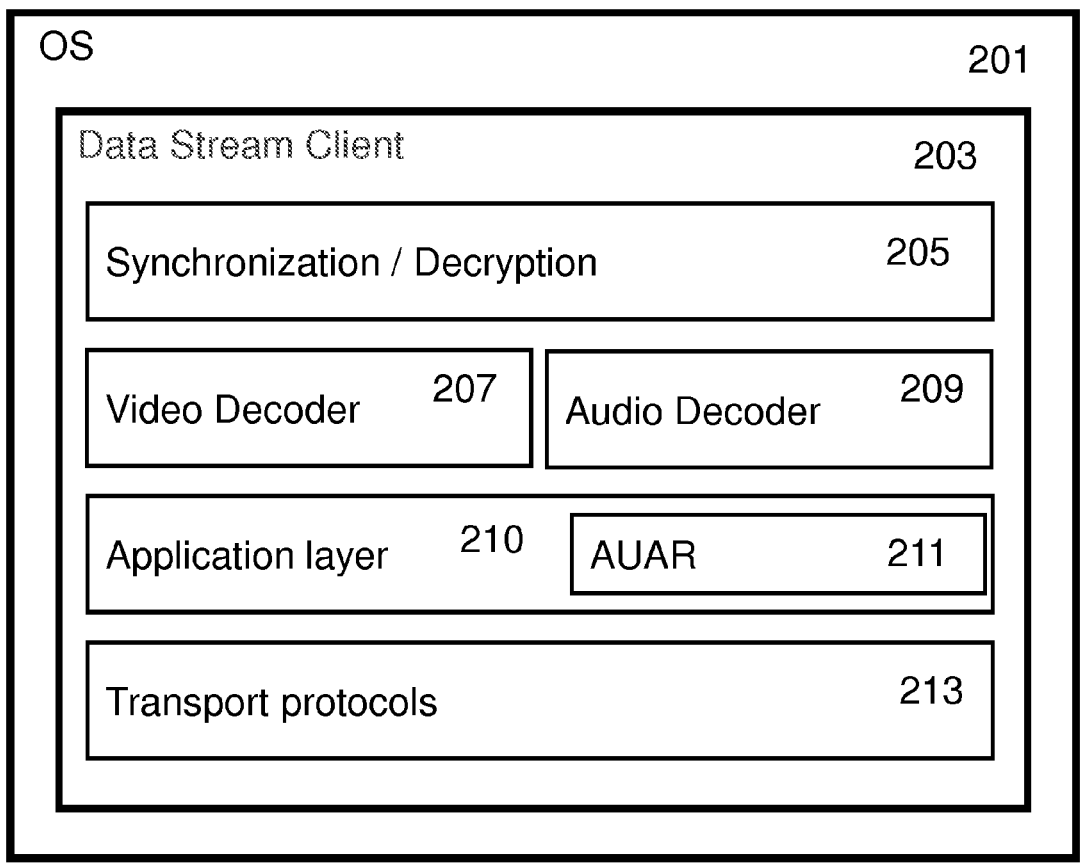
FIG. 2 illustrates a functional architecture for implementing a method for controlling the data stream.

At step S101, a user may command a data stream to be sent from a data stream server 602 (see FIG. 6) to a data stream client 203 (see FIG. 2). The data stream client 203 may be executed on a client computer 200 (see FIG. 2). The client computer 200 may be implemented as a mobile computer or a desktop computer. The mobile computer may be implemented as a tablet (e.g. an iPad; iPad is a trademark of Apple Corporation) or a smartphone. A server computer 301 (see FIG. 3) may be implemented as a desktop computer, i.e. a general purpose computer) or a mobile computer. The data stream client 203 may execute on the client computer 200 and the data stream server 602 may execute on the server computer 301.

In response to a user command entered at step S103, the data stream client 203 may establish a session with the data stream server 602. According to an example, the data stream client 203 is implemented as a media player which establishes a session with a media streaming server, such as data stream server 602. According to the example, the session may be established using the real time streaming protocol (RTSP). Other application protocols, in particular Internet application protocols according to the Open Systems Interconnection (OSI) model, could also be used. The session may be established by means of an RTSP setup request. An RTSP play request may be sent from the data stream client 203 to the data stream server 602 to trigger sending of the data stream.

At step S105, the data stream server 602 begins to send a data stream to the data stream client 203. According to an example, the data stream sent from the data stream server 602 to the data stream client 203 includes video data and is sent using a connectionless Internet transport protocol. More particularly, the data stream may be sent using the real time transport protocol (RTP). RTP may be used in conjunction with the RTP control protocol (RTCP). RTP may be supported by another protocol, such as the user datagram protocol (UDP).

In cases where the data stream is sent using the connectionless Internet transport protocol, the server computer 301 has no knowledge of what happens after a packet of the data stream is sent and receives no indication that the client computer 200 is receiving or processing the data stream (i.e. the server receives no acknowledgements of individual data packets from the client computer 200). In particular, the client computer 200 may no longer process the data stream (e.g. packets of the data stream may be dropped by the client computer 200) when the client computer 200 is no longer in a fully working power state. For example, when the client computer 200 is transitioning (or has transitioned) from a fully working power state to a decreased power consumption state, the data stream client 203 may no longer be in a position (i.e. the data stream client 203 may no longer be able) to process the data stream. Similarly, a user may be unable to view video at the data stream client 203 during a decreased power consumption state even if the data stream is being processed by client computer 200. This can occur, for example, when a display of the client computer 200 has been shut off but data stream packets received by the client computer 200 continue to be processed. Thus, when the client computer 200 is in a decreased power consumption state, continuing to send the data stream from the data stream server 602 to the data stream client 203 may waste network resources.

At step S107, the client computer 200 may generate a power management decrease event. The power management decrease event may be generated as a result of a change in one or more of the following: system power status, the operational mode of a device or the system, or a change in the value of a power setting. In particular, the power management decrease event may occur when there is a pending transition from a fully working power state to a decreased power consumption state. Such a transition may be triggered by user interaction with the client computer 200, e.g. the user hits a sleep key or pushes a power button of the client computer 200. The transition from the fully working power state to the decreased power consumption state could also be triggered by inactivity of the user.

At step S109, a first pause request may be sent from the data stream client 203 to the data stream server 602. The first pause request may have the purpose of temporarily halting the data stream. The first pause request may have a temporal relation as well as a causal relation to the power management decrease event. In particular, the first pause request may be sent after the power management decrease event. Also, the first pause request may be triggered by the power management decrease event.

The power management decrease event may serve as an indication that the client computer 200 can no longer process the data stream and/or the user is no longer interested in the data stream. In particular, when the data stream is implemented as a video stream, the power management decrease event may indicate that the user is no longer watching the video stream. Sending the first pause request to the data stream server 602 may be understood as forwarding the power state of the client computer 200 to the data stream server 602.

At step S111, the data stream server 602 receives the pause request from the data stream client 203. In response to the pause request, the data stream server 602 temporarily halts (pauses) the data stream. Pausing the data stream may have the technical effect of conserving network resources, or more specifically conserving network bandwidth, particularly since network bandwidth is not used to send the data stream to the client computer 200 when the client computer 200 cannot process the data stream. Pausing the data stream may also conserve processing and storage resources on the server computer 301.

Also, pausing the data stream according to the approach described above may have the advantage of improving quality of service for other network users. For example, as discussed in more detail in connection with FIG. 5, if a second client computer uses the same network connection as the client computer 200 and both share the network bandwidth of the network connection (e.g. the network connection is a cable or wireless connection), then pausing the data stream to the client computer 200 may have the effect of increasing the bandwidth available to the second client computer.

FIG. 2 shows a functional architecture that may be used for implementing the method for controlling the data stream on the client computer 200. The client computer 200 includes an operating system 201. The operating system 201 may be a version of Microsoft Windows (e.g. Windows 8, Windows 7, Windows Vista, Windows XP, Windows 2000 or Windows 98), Mac OS X (e.g. Leopard, Snow Leopard, Lion; Mac is a trademark of Apple Corporation), or Linux. In particular, the operating system 201 may be compliant with ACPI or may implement a customized power management solution based on Advanced Power Management and/or the Hardware Abstraction Layer (HAL). Other operating systems capable of running the data stream client 203 and processing power management events are also possible.

The data stream client 203 interacts with the operating system 201. The data stream client 203 may be implemented as a media player or as other software capable of processing the data stream. The data stream client 203 may include a synchronization/decryption module 205. The synchronization/decryption module 205 may decrypt and/or synchronize the data stream in order to present a consistent and unrestricted data stream. In particular, the synchronization/decryption module 205 may be responsible for negotiating and adapting the rate at which the data stream is sent from the data stream server 602 to the data stream client 203, and dealing with authentication and/or copy protection.

According to the example where the data stream is a video stream, a video decoder 207 may be part of the data stream client 203. The video decoder 207 can be used to decompress the video stream received by the data stream client 203. In particular, the video decoder 207 may operate by applying the reverse of the algorithm used to encode the video stream.

An audio decoder 209 may enable the decompression of audio data received by the data stream client 203. The audio decoder 209 may operate by applying the reverse of the algorithm used to encode audio data in the data stream.

If the data stream is implemented as an audio stream, the data stream may be compressed using an audio codec such as MP3 or AAC. If the data stream is implemented as a video stream, the data stream may be compressed using a video codec such as H.264 or VP8. The data stream may be assembled in a container bit stream such as FLV or WebM.

The video decoder 207 and the audio decoder 209 may be used in combination with specific compression formats, such as MPEG-2 (for a video stream) or MP3 (for an audio stream). Alternatively, a data stream including video and/or audio that is received by the client computer 200 may be in raw format, such that no compression is used to send the data stream and no decompression is needed to process the data stream.

The data stream client 203 may also include an application layer 210. The application layer 210 may manage application protocols used to process data received by the data stream client 203 from the data stream server 602. For example, the application layer 210 may manage RTSP and/or Microsoft media server (MMS) protocols. The application layer 210 may also be responsible for quality of service (QOS) management. The application layer may provide services and functionality according to the OSI model.

An automatic user activity recognition (AUAR) module 211 may intercept power management events, e.g. from the operating system 201, and generate a pause request to temporarily halt the data stream from the data stream server 602. In particular, based on a received power management decrease event, the AUAR module 211 may determine when the user is no longer interested in the data stream (e.g. the user is no longer watching video data transported over the data stream) and generate the pause request to be sent to the data stream server 602. The result of the pause request may be a temporary halt in the flow of the data stream from the data stream server 602 to the data stream client 203.

The automatic user activity recognition module may be embedded in the data stream client 203. Functions of the automatic user activity recognition module 211 may include listening for power management events (e.g. power management decrease events or power management increase events) and triggering the sending of pause or resume requests based on the receipt of the power management events.

In cases where power management events are distributed by the operating system 201 as part of messages, the power management events may be distributed in broadcast messages such as the WM_POWERBROADCAST message, which is sent to applications and installable drivers whenever a power management event occurs. The events sent in a WM_POWERBROADCAST messages may include PBT_APMSUSPEND and PBT_APMRESUMESUSPEND events. These events may be intercepted by the automatic user activity recognition module 211 of the data stream client 203. The automatic user activity recognition module 211 may communicate using the network control protocol of the data stream client 203.

A transport protocol layer 213 may manage transport protocols used to process data sent from the data stream server 602 to the data stream client 203. In particular, the transport protocol layer 213 may manage Internet transport protocols such as the transmission control protocol (TCP), UDP and RTP.

Figure 3:
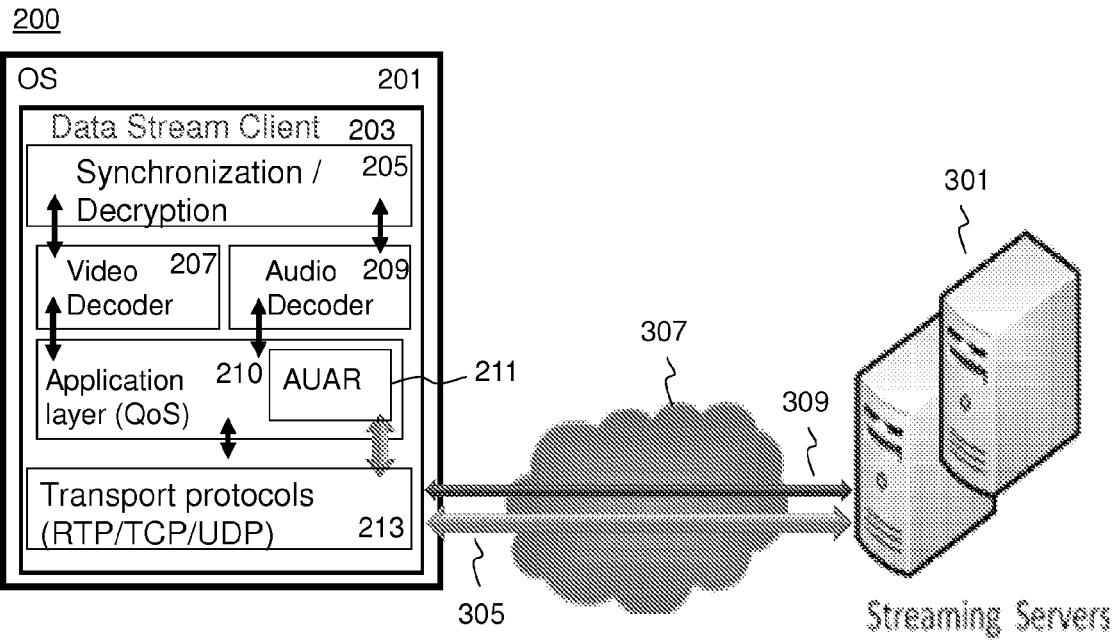
FIG. 3 provides further details regarding the functional architecture of FIG. 2.

FIG. 3 shows an exemplary implementation for a system controlling a data stream including the functional architecture of FIG. 2.

FIG. 3 depicts the functional architecture of the client computer 200 including the operating system 201, the data stream client 203, the synchronization/decryption module 205, the video decoder 207, the audio decoder 209, the application layer 210, the automatic user activity recognition module 211, and the transport protocol layer 213. Unless otherwise noted or implied, the components of the functional architecture depicted in FIG. 3 perform as described with the respect to FIG. 2.

FIG. 3 also depicts multiple bi-directional arrows in the functional architecture of the client computer 200 showing interactions between components of the data stream client 203. In particular, the synchronization/decryption module 205 communicates in a bi-directional manner with the video decoder 207 and the audio decoder 209. The video decoder 207 and the audio decoder 209 communicate in a bi-directional manner with the application layer 210. The application layer 210 communicates in a bi-directional manner with the transport protocol layer 213. Also, the automatic user activity recognition module 211 communicates in a bi-directional manner with the transport protocol layer 213.

The AUAR module 211 may also be referred to as automatic video bandwidth control module.

FIG. 3 also depicts interactions between the client computer 200 and the server computer 301. As depicted in FIG. 3, the server computer 301 may be implemented as multiple streaming servers. Alternatively, the server computer 301 may be implemented as a single server. A thick bi-directional arrow 305 shows a request from the data stream client 203 to the server computer 301 for a data stream. Following the request, server computer 301 sends the data stream to the data stream client 203. In particular, the data stream may be sent from the data stream server 602 on the server computer 301. Thus, following the request, the data stream is received by the data stream client 203 from the data stream server 602. The data stream client 203 may be connected to the server computer 301 via a network 307, such as the Internet. A thin bi-directional arrow 309 shows a pause request sent from the data stream client 203 to the server computer 301. The thin arrow 309 is bi-directional in order to reflect the acknowledgment of the pause request by the server computer 301.

The network 307 may be implemented in multiple ways, including via physical cable (e.g. fiber optic cable) or via wireless technologies (e.g. WiFi, WiMAX, cellular/mobile, etc.). Advantageously, the claimed subject matter may be applicable in situations where the available bandwidth is low or expensive, e.g. a cellular network operating at 1-2 Mbps.

Figure 4:
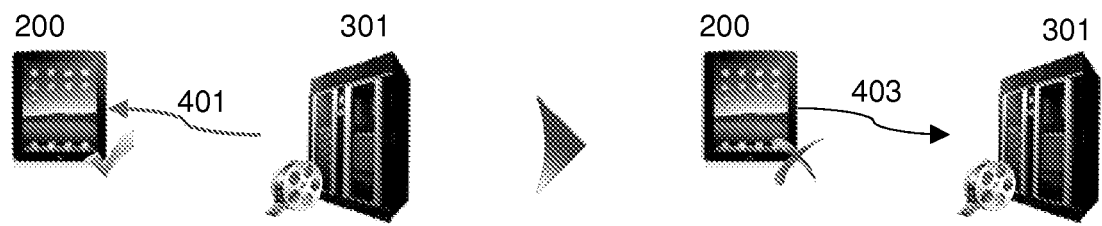
FIG. 4 illustrates a way that the method for controlling the data stream can be used to conserve network resources.
Figure 5:
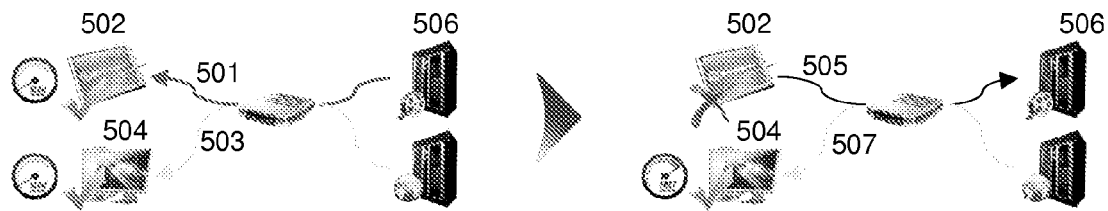
FIG. 5 illustrates another way that the method for controlling the data stream can be used to conserve network resources.

FIGS. 4 and 5 show ways that the method for controlling the data stream from the server computer 301 to the client computer 200 can be used to conserve (i.e. save or reduce consumption of) network resources. In particular, FIGS. 4 and 5 show how both users of the client computer 200 and content providers, such as media companies providing the data stream from the server computer 301, can save money through the reduction of network resources and the computer system architecture required. The network resources may include bandwidth used by the client computer 200, the server computer 301 or both. The computer system architecture may include hardware at the content provider, such as routers, switches and other types of network infrastructure. Thus, FIGS. 4 and 5 show how the method for controlling the data stream from the server computer 301 to the client computer 200 can be used to automatically conserve (e.g. reduce consumption of) network resources without any explicit intervention.

The users of the client computer 200 may have a variety of data plans, such as a plan providing unlimited network bandwidth for a fixed price or a pay as you go plan (i.e. a plan where the user is charged increasing amounts depending on bandwidth consumption). Users may also be enrolled in plans which reduce allowable bandwidth consumption after a certain amount has been used (e.g. after 500 MB have been used during a month, the user's available bandwidth is reduced for the rest of that month).

FIG. 4 shows how the method for controlling the data stream from the server computer 301 to the client computer 200 can be used to conserve network resources in the case where the client computer 200 does not share network bandwidth with another computer (e.g. via statistical multiplexing over a residential broadband connection such as Cable Internet). An arrow 401 shows the data stream being sent from the data stream server 602 to the data stream client 203. According to the example depicted, a user of the data stream client 203 is watching a video stream using a mobile device, where the video stream is an implementation of the data stream and the mobile device is an implementation of the client computer 200. The data stream may be consuming network bandwidth that has been paid for as part of a prepaid contract with a network access provider (e.g. an Internet Service Provider).

An arrow 403 shows the first pause request sent from the data stream client 203 to the data stream server 602. For example, when the user is no longer watching a video generated by means of the data stream, a power management decrease event may be generated by the operating system 201. The power management decrease event may be received by the data stream client 203. More specifically, the power management decrease event may be received by the automatic user activity recognition module 211.

After the power management decrease event is received by the data stream client 203, the first pause request may be sent from the data stream client 203 to the data stream server 602. The first pause request may cause the flow of the data stream to be halted, thereby conserving (or saving) network resources. In particular, by halting the data stream, the first pause request may save money (e.g. for the user of the data stream client 203 and/or the content provider) by reducing the consumption of network bandwidth. Moreover, sending the first pause request may avoid having the data stream server 602 perform unnecessary work. In particular, sending the first pause request may avoid having the data stream server 602 send the data stream when the data stream client 203 is not in a position to process the data stream.

Also, sending the first pause request may conserve processing resources on the server computer 301, e.g. to read the data stream from disk and copy the data stream to main memory or to copy the data stream from main memory to the network 307 to the client computer 200.

FIG. 5 shows how the method for controlling the data stream from the server computer 301 to the client computer 200 can be used to conserve network resources when there are multiple users simultaneously using an Internet connection.

Simultaneous use of Internet connections can occur in multiple situations, for example, cable Internet access or wireless Internet access. In other words, the situation depicted in FIG. 5 may occur when a plurality of users share available network bandwidth. An arrow 501 shows a first data stream being sent to a first client computer 502 and an arrow 503 shows a second data stream being sent to a second client computer 504. The data streams may originate from multiple data streams servers, and possibly multiple server computers. Unless otherwise noted, the description of the client computer 200 applies to the first client computer 502 and the second client computer 504.

The data streams may contain the same data or different data. For example, the arrow 501 may show the first data stream being sent from www.youtube.com (or a media server associated with www.youtube.com), while the arrow 503 may show the second data stream being sent from www.thedailyshow.com (or a media server associated with www.thedailyshow.com). Because the first client computer 502 and the second client computer 504 are sharing limited network bandwidth, both the first client computer 502 and the second client computer 504 may experience poor performance, e.g. poor video quality or pauses in the video data stream.

An arrow 505 shows a pause request sent from the first client computer 502 to a server computer 506 (unless otherwise noted, the description of the server computer 301 applies to the server computer 506) in order to temporarily halt the data stream being received by the first client computer 502. The pause request may have been generated by an automatic user activity recognition module (identical to the automatic user activity recognition module 211) on the first client computer 502 in response to a power management decrease event generated by the first client computer 502.

An arrow 507 indicates that the second client computer 504 continues to receive a video stream. Since the second client computer 504 is no longer sharing network bandwidth with the first client computer 502, the second client 504 may experience improved performance. In particular, according to the specific example in which the second client computer 50 is receiving a video data stream, the video data being received by the second client computer 504 may be of high quality without pauses or undesirable effects.

Figure 6:
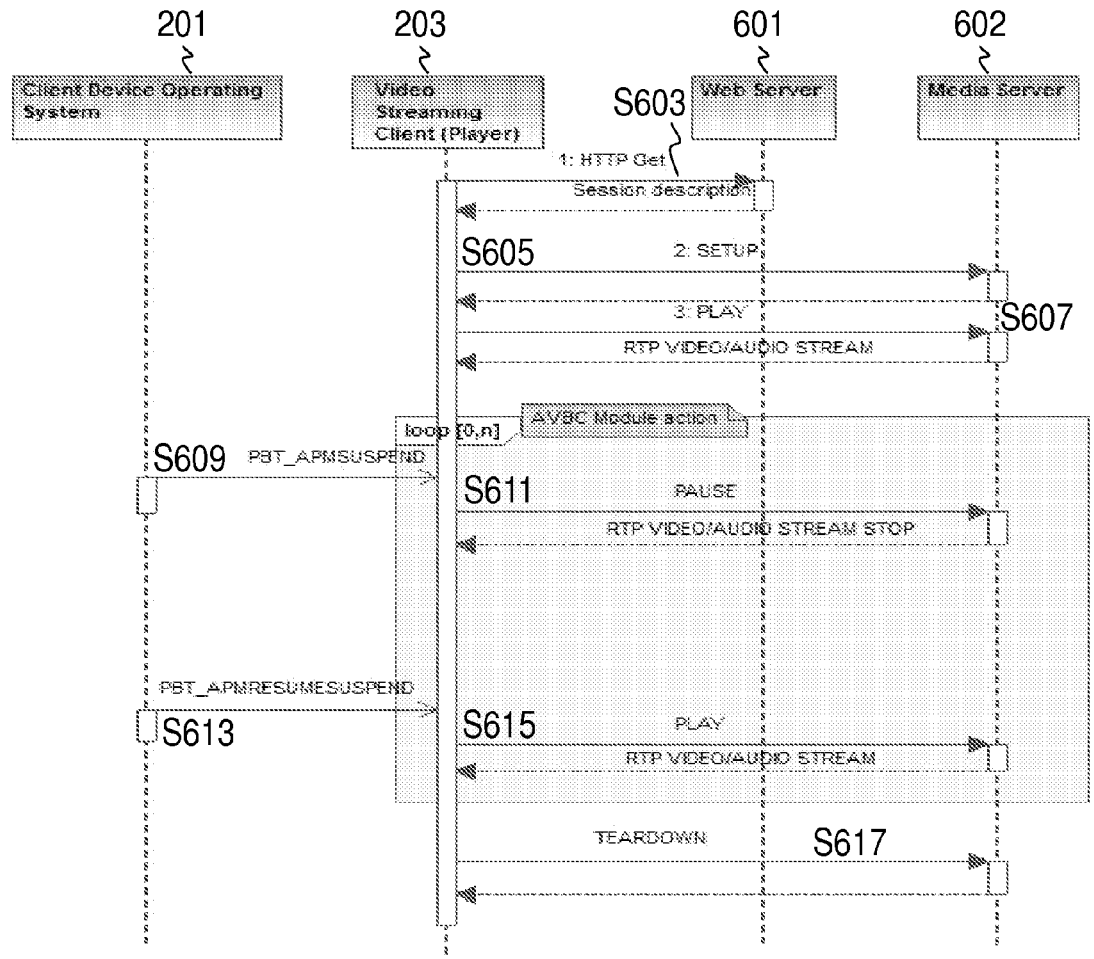
FIG. 6 illustrates in an action that may occur between various computers when carrying out the method for controlling the data stream.

FIG. 6 shows the steps carried out in the method for controlling the data stream from the server computer 301 to the client computer 200.

At step S603, a hypertext transfer protocol (HTTP) GET request is sent from the data stream client 203 (implemented as a video streaming client in FIG. 6) to a web server 601.

During step S603, the data stream client 203 may interact with the web server 601 using a uniform resource locator (URL) to retrieve information (e.g. a manifest) about a video the user wishes to view. Step S603 may also include the web server 601 providing a manifest to the data stream client 203 in response to the HTTP get request. In particular, the web server 601 may provide the data stream client 203 with information that can be used to retrieve the data stream from the data stream server 602 (implemented as a media server in FIG. 6).

Unless otherwise noted, description of the server computer 301 applies to the web server 601 and the data stream server 602. Particularly, the server computer 301 may include the web server 601 and the data stream server 602. Alternatively, the server computer 301 may only include the web server 601 and the data stream server 602 may be implemented on a separate computer. Other implementations are also possible (e.g. either the web server 601 or the data stream server 602 or both may be implemented via multiple computers).

At step S605, the data stream client 203 may send a request to the data stream server 602 specifying how the data stream is to be transported. According to the example depicted in FIG. 6, the data stream server 602 is a media server and the data stream is a media stream. The request in step S605 may include a URL of the media stream and a transport specifier. The request may be an RTSP setup request. The transport specifier may include a first local port number for receiving audio and/or video data and a second local port number for receiving meta information. According to an example, the request of step S605 may be an RTSP request specifying a local port for receiving RTP data and another local port for receiving RTCP data. Step S605 may include a response from the server confirming the configuration information specified by the data stream client 203 and specifying additional information, such as one or more ports chosen by the data stream server 602. A timeout for the session may be specified, e.g. by the data stream server 602.

Although depicted separately in FIG. 6, the web server 601 and the data stream server 602 may be implemented on the same computer system. Alternatively, the web server 601 and the data stream server 602 may be implemented using different computer systems.

The exchange between the data stream client 203 and the data stream server 602 in step S605 may be an RTSP setup request and response.

At step S607, a request to start transmitting the data stream may be received at the data stream server 602. In particular, the request received at step S607 at the data stream server 602 from the data stream client 203 may be an RTSP play request. The request received at the data stream server 602 may cause the media stream to be played. In some cases, the request may cause multiple media streams to be played. Multiple play requests may be included in the request sent at step S607. Additional parameters may be included, such as a range, i.e. a starting point and an ending point of the data stream that should be transmitted from the data stream server 602 to the data stream client 203. The request sent from the data stream client 203 to the data stream server 602 in step S607 may cause the data stream server 602 to send the data stream to the data stream client 203. In particular, the data stream server 602 may send a video stream using the RTP protocol to the data stream client 203.

At step S609, the operating system 201 generates a power management decrease event. According to the example depicted in FIG. 6, the operating system 201 generates a PBT_ATMSUSPEND event. The power management decrease event is received by the data stream client 203. In particular, the automatic user activity recognition module 211 intercepts a message including the power management decrease event. The message may be a broadcast message sent to all applications and drivers in the client computer 200. After receiving the power management decrease event, the data stream client 203 may send a pause request to the data stream server 602 at step S611. According to the example, the pause request is implemented as an RTSP pause command. Receipt of the pause request may cause the data stream server 602 to temporarily halt (i.e., stop) the data stream. After sending the pause request, the client computer 200 may transition from a fully working power state to a decreased power consumption state in response to the power management decrease event. The client computer 200 may transition from the fully working power state to the decreased power state before or after the data stream server temporarily halts the data stream.

As step S613, the operating system 201 may generate a power management increase event. The power management increase event may be generated after the client computer 200 transition from the decreased power consumption state to the fully working power state. According to the specific example depicted in FIG. 6, the power management increase event is implemented as a PBT_APMRESUMESUSPEND event. A message including the power management increase event may be received by the data stream client 203.

After receiving the power management increase event, the data stream client 203 may send a resume request to the data stream server 602 at step S615. There may be a causal relationship between the power management increase event and the resume request, i.e. the resume request may be triggered by the power management increase event. Also, there may be a temporal relationship between the power management increase event and the resume request, i.e. the resume request may be sent after the power management increase event.

The resume request may be implemented as an RTSP play request. In response to the resume request, the data stream server 602 may start to send the data stream again. The data stream may be received at the data stream client 203. Alternatively, if the timeout for the session is specified in step S605 (e.g. in a timeout parameter), the session may timeout before the resume request is transmitted at step S615, e.g. because the time between sending the pause request at step S611 and the resume request at step S615 exceeds the time specified in the timeout parameter. In this case the session may need to be reestablished, e.g. by sending a new setup request as described in step S605. Thus, the new setup request may be sent at step S615 rather than the resume request if the session times out. In some cases, even if the session is reestablished, the data stream client 203 may be able to resume the data stream where it was paused, e.g. by saving a pause point of the data stream and transmitting the pause point in a new request to start transmitting the data stream (as described in S607).

The pause request sent at step S611 and the resume request sent at step S615 may be sent by means of the automatic user activity recognition module 211. Moreover, the power management decrease event received by the data stream client 203 at step S609 and the power management increase event received by the data stream client 203 at step S613 may be received and processed by means of the automatic user activity recognition module 211.

At step S617, a command may be sent form the data stream client 203 to the data stream server 602 to terminate the session in which the data stream is sent. The command may cause all data streams being sent from the data stream server 602 to the data stream client 203 to be stopped and free all session related data on the data stream server 602 that is associated with the data stream client 203. The command sent in step S617 may be implemented as an RTSP teardown request.

In the example of FIG. 6, the automatic user activity recognition module 211 may be active during steps S609, S611, S613, and S615. The automatic user activity recognition module 211 may also be referred to as the automatic video bandwidth control (AVBC) module.

Figure 7:
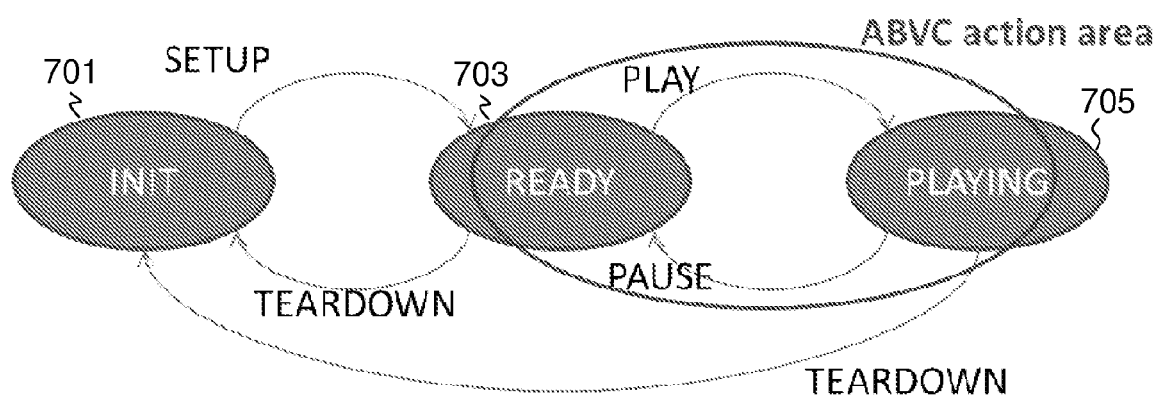
FIG. 7 illustrates states of a system for controlling a data stream.

FIG. 7 shows a state diagram for the data stream client 203.

According to the example depicted, the state transitions are executed by means of RTSP commands.

An RTSP setup command sent from the data stream client 203 to the data stream server 602 enables a transition from an init state 701 to a ready state 703. In the ready state 703, a session between the data stream client 203 and the data stream server 602 is established. Thus, after the RTSP setup command has been sent from the data stream client 203 to the data stream server 602, the data stream can be received at the data stream client 203 from the data stream server 602. Also, RTSP play and pause command can be sent from the data stream client 203 to the data stream server 602 and processed by the data stream server 602. Thus, in the ready state 703, the data stream client 203 (particularly the automatic user activity recognition module 211) is in a position to control the data stream from the server computer 301 to the client computer 200.

After execution of an RTSP play command, the data stream client 203 transitions from the ready state 703 to a playing state 705. In the playing state 705, the data stream client 203 receives the data stream from the data stream server 602. When the data stream client 203 sends a pause request to the data stream server 602, the data stream client 203 transitions from the playing state 705 to the ready state 703. As indicated in FIG. 7, the automatic user activity recognition module 211 is active when the data stream client 203 is in the ready state 703 or the playing state 705. A teardown command sent from the data stream client 203 to the data stream server 602 can cause the data stream client 203 to transition back to the init state 701. Sending of a teardown command causes the transition back to the init state 701 irrespective of whether the data stream client 203 is in the ready state 703 or the playing state 705.

Figure 8:
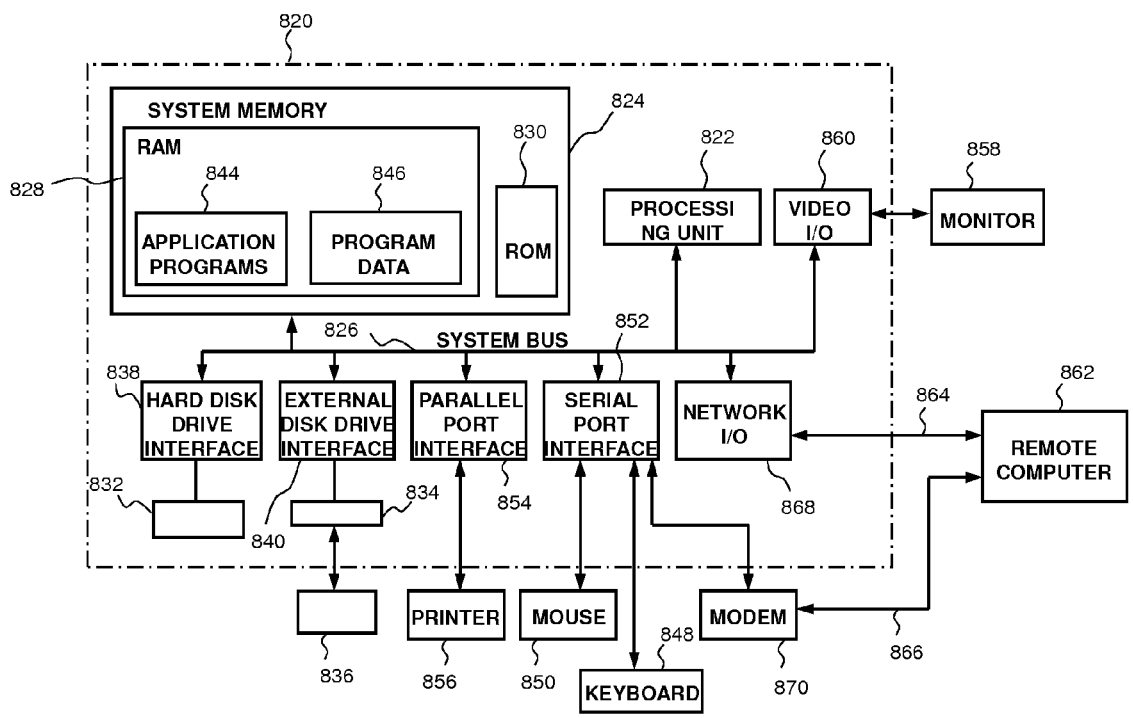
FIG. 8 shows an exemplary system for implementing the claimed subject matter, e.g. a client computer and/or a server computer.

FIG. 8 shows an exemplary system for implementing the claimed subject matter including a general purpose computing device in the form of a conventional computing environment 820 (e.g. a personal computer). The system of FIG. 8 may be used to implement the server computer 301 or the client computer 200. Other implementations are possible.

The conventional computing environment includes a processing unit 822, a system memory 824, and a system bus 826. The system bus couples various system components including the system memory 824 to the processing unit 822. The processing unit 822 may perform arithmetic, logic and/or control operations by accessing the system memory 824. The system memory 824 may store information and/or instructions for use in combination with the processing unit 822. The system memory 824 may include volatile and non-volatile memory, such as a random access memory (RAM) 828 and a read only memory (ROM) 830. A basic input/output system (BIOS) containing the basic routines that helps to transfer information between elements within the personal computer 820, such as during start-up, may be stored in the ROM 830. The system bus 826 may be any of several types of bus structures including a memory bus or memory controller, a peripheral bus, and a local bus using any of a variety of bus architectures.

The personal computer 820 may further include a hard disk drive 832 for reading from and writing to a hard disk (not shown), and an external disk drive 834 for reading from or writing to a removable disk 836. The removable disk may be a magnetic disk for a magnetic disk driver or an optical disk such as a CD ROM for an optical disk drive. The hard disk drive 832 and the external disk drive 834 are connected to the system bus 826 by a hard disk drive interface 838 and an external disk drive interface 840, respectively. The drives and their associated computer-readable media provide non-volatile storage of computer readable instructions, data structures, program modules and other data for the personal computer 820. The data structures may include relevant data for the implementation of the method for controlling a data stream from a server computer to a client computer, as described above.

Although the exemplary environment described herein employs a hard disk (not shown) and an external disk 836, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 836, ROM 830 or RAM 828, including an operating system (not shown), one or more application programs 844, other program modules (not shown), and program data 846. The application programs may include at least a part of the functionality as depicted in FIGS. 1 to 7.

A user may enter commands and information, as discussed below, into the personal computer 820 through input devices such as keyboard 848 and mouse 850. Other input devices (not shown) may include a microphone (or other sensors), joystick, game pad, scanner, or the like. These and other input devices may be connected to the processing unit 822 through a serial port interface 852 that is coupled to the system bus 826, or may be collected by other interfaces, such as a parallel port interface 854, game port or a universal serial bus (USB). Further, information may be printed using printer 856. The printer 856, and other parallel input/output devices may be connected to the processing unit 822 through parallel port interface 854. A monitor 858 or other type of display device is also connected to the system bus 826 via an interface, such as a video input/output 860. In addition to the monitor, computing environment 820 may include other peripheral output devices (not shown), such as speakers or other audible output.

The computing environment 820 may communicate with other electronic devices such as a computer, telephone (wired or wireless), personal digital assistant, television, or the like. To communicate, the computer environment 820 may operate in a networked environment using connections to one or more electronic devices. FIG. 8 depicts the computer environment networked with remote computer 862. The remote computer 862 may be another computing environment such as a server, a router, a network PC, a peer device or other common network node, and may include many or all of the elements described above relative to the computing environment 820. The logical connections depicted in FIG. 8 include a local area network (LAN) 864 and a wide area network (WAN) 866. Such networking environments are commonplace in offices, enterprise-wide computer networks, intranets and the Internet and may particularly be encrypted.

When used in a LAN networking environment, the computing environment 820 may be connected to the LAN 864 through a network I/O 868. When used in a WAN networking environment, the computing environment 820 may include a modem 870 or other means for establishing communications over the WAN 866. The modem 870, which may be internal or external to computing environment 820, is connected to the system bus 826 via the serial port interface 852. In a networked environment, program modules depicted relative to the computing environment 820, or portions thereof, may be stored in a remote memory storage device resident on or accessible to remote computer 862. Furthermore other data relevant to the method for controlling a data stream from a server computer to a client computer (described above) may be resident on or accessible via the remote computer 862. It will be appreciated that the network connections shown are exemplary and other means of establishing a communications link between the electronic devices may be used.

The above-described computing system is only one example of the type of computing system that may be used to implement the method for controlling a data stream from a server computer to a client computer.

According to an aspect, a computer implemented method for controlling a data stream from a server computer to a client computer is provided. The client computer comprises a data stream client and the server computer comprises a data stream server. While receiving, by the data streaming client from the data stream server, the data stream, the method may comprise generating, by the client computer, a power management decrease event. While receiving the data stream, the method may further comprise, receiving, by the data stream client, the power management decrease event. While receiving the data stream, the method may further comprise sending, from the data stream client to the data stream server, a first pause request to temporarily halt the data stream. The first pause request may be sent after the power management decrease event is received. The method may further comprise transitioning, by the client computer, from a fully working power state to a decreased power consumption state in response to the power management decrease event.

Transitioning from the fully working power state to the decreased power consumption state may also be performed after the power management decrease event. In other words, there may be a temporal relationship between the power management decrease event and the transition from the fully working power state to the decreased power consumption state.

In some cases, the fully working power state is the fully on ACPI power state and the decreased power consumption state is an ACPI power state other than the fully on ACPI power state.

The decreased power consumption state may be a sleeping state, such as a sleep state, a hibernating state, a standby state, or a suspend state. Also, the decreased power consumption state may be a soft off state, or a fully off state. The fully off state may also be referred to as a mechanical off state.

The fully working power state may be the full on APM state and the decreased power consumption state may be an APM state other than the full on APM state.

In some cases, the method further comprises pausing, by the data stream server, the data stream in response to the first pause request. The pause by the data stream server may occur before or after the client computer transitions from the fully working power state to the decreased power consumption state.

Furthermore, the data stream may be a media stream, wherein the media stream includes audio data and/or video data.

Moreover, the data stream may be sent using a connectionless Internet transport protocol. The term "transport protocol" may be understood according to the open systems interconnection (OSI) model.

The data stream may be sent using the real time transport protocol.

In addition, the method may further comprise transitioning, by the client computer, from the decreased power consumption state to the fully working power state. Also, the method may comprise generating, by the client computer, a power management increase event after the transition from the decreased power consumption state to the fully working power state. In addition, the method may comprise receiving, by the data stream client, the power management increase event. Also, the method may comprise sending, from the data stream client to the data stream server, a first resume request. The first resume request may be sent after the power management increase event is received. Also, the method may comprise receiving, at the data stream client and from the data stream server, the data stream.

In addition, the power management increase event and/or the power management increase event may be operating system events.

The first pause request and/or the first resume request may be sent using an Internet application protocol for delivery of data with real time properties. The term application protocol may be understood according to the OSI model. In this context, delivery may refer to the setup of the session and control of the data. The application protocol may be the real time streaming protocol or the Microsoft media server protocol.

In some cases, the method may further comprise, broadcasting, by the client computer, a power management decrease message. The power management decrease message may include the power management decrease event. Receiving the power management decrease event may comprise receiving the power management decrease message. The power management decrease event may be received at a first window of the data stream client.

Furthermore, the method may comprise broadcasting, by the client computer, a power management increase message. The power management increase message may include the power management increase event. Receiving the power management increase event may comprise receiving the power management increase message. The power management increase event may be received at the first window of the data stream client.

The power management decrease event may be generated approximately two seconds before the transition from the fully working power state to the decreased power consumption state. Alternatively, the power management decrease event may be generated approximately five or ten seconds before the transition from the fully power state to the decreased power consumption state. The power management decrease event may be generated between two and ten seconds before the transition from the fully working power state to the decreased power consumption state. The power management decrease event may be generated between ten and twenty seconds before the transition from the fully working power state to the decreased power consumption state. The power management decrease event may be generated between two and twenty seconds before the transition from the fully working power state to the decreased power consumption state. The power management decrease event may be generated up to twenty seconds (i.e. as much as twenty seconds) before the transition from the decreased power consumption state to the fully working power state.

Generating the power management decrease event approximately two seconds before the transition before the fully working power state to the decreased power consumption state corresponds to the functionality of Microsoft Windows Vista and Microsoft Windows 7. Generating the power management decrease event up to twenty seconds before the transition from the decreased power consumption state to the fully working power state corresponds to the functionality of Windows 2003 and Windows XP. Thus, a temporal relationship between the power management increase event and the transition from the fully working power state to the decreased power consumption state may be defined according to the operating system of the client computer.

In some cases, the data stream is temporarily halted at a point in the data stream. The data stream client may begin receiving the data stream at the point where the data stream was temporarily halted.

Furthermore, the power management decrease event may be generated in response to one or more of the following: a decrease in power consumption of the client computer, inactivity of the client computer, user input (e.g. manually putting the client computer to sleep or receiving a command from the user instructing the client computer to sleep), or a pending transition from the fully working power state to the decreased power consumption state.

Moreover, the power management increase event may be generated in response to one or more of the following: user activity (e.g. pressing the power button), or user interaction (mouse or keyboard input).

In addition, the client computer may consume less power in the decreased power consumption state than in the fully working power state. The client computer may be fully on in the fully working power state. It is possible that the client computer is not fully on in the decreased power consumption state.

Also, at least one device of the client computer may be in a power saving mode in the decreased power consumption state.

In some cases, the method may further comprise executing the data stream client on the client computer, and executing the data stream server on the server computer.

Also, the method may further comprise determining that the first window of the data stream client is not visible. In response to the determination that the first window is not visible the method may further comprise, sending, from the data stream client to the data stream server, a second pause request to temporarily halt the data stream.

The method may further comprise, after determining that the first window of the data stream client is not visible, determining that the first window of the data stream client is visible. Also, in response to the determination that the first window is visible, the method may further comprise sending a second resume request to the data stream server. Additionally, the method may comprise receiving, at the data stream client and from the data stream server, the data stream.

According to a specific implementation, the is WindowVisible function may be used to perform the determination of visibility and the determination of non-visibility. Alternatively, visibility of the first window may be determined according to whether the first window is obscured by one or more further windows. In other words, the determination that the first window is not visible may be made if the first window is partly or entirely covered by one or more further windows.

What is claimed is:

1. A computer-implemented method for controlling a data stream from a data stream server to a data stream client, the method comprising:
    while receiving, by the data stream client from the data stream server, the data stream:
        receiving, by the data stream client, a power management decrease event;
        sending, from the data stream client to the data stream server, a first pause request to temporarily halt the data stream, wherein the first pause request is sent in response to receipt of the power management decrease event;
    receiving, by the data stream client, a power management increase event;
    sending, from the data stream client to the data stream server, a first resume request, wherein the first resume request is sent in response to receipt of the power management increase event and the power management increase event is received prior to a timeout after which a network streaming session of the data stream is aborted; and
    after the network streaming session is aborted, sending, from the data stream client to the data stream server, a second resume request, wherein the second resume request is sent after the power management increase event, wherein the second resume request comprises a new session request and an indication where the data stream was paused at the time of the first pause request.

2. The method of claim 1, wherein the data stream is a media stream, and wherein the media stream includes at least one of audio data or video data.

3. The method of claim 1, wherein the data stream is sent using at least one of a connectionless Internet transport protocol or a Real-Time Transport Protocol.

4. The method of claim 1, further comprising:
transitioning, by the data stream client, from a decreased power consumption state to a fully working power state in response to receipt of the power management increase event.

5. The method of claim 4, wherein at least one of the power management decrease event or the power management increase event are operating system events.

6. The method of claim 1, wherein at least one of the first pause request or the first resume request are sent using an Internet application protocol for delivery of data with real-time properties.

7. The method of claim 1, wherein:
receiving the power management decrease event comprises receiving a power management decrease message that comprises the power management decrease event; and
wherein the power management decrease event may be received at a first window of the data stream client.

8. The method of claim 1, wherein the power management decrease event is generated in response to at least one of:
a decrease in power consumption of the data stream client;
inactivity of the data stream client;
user input; or
a pending transition of the data stream client from a fully working power state to a decreased power consumption state.

9. The method of claim 1, further comprising:
determining that a first window of the data stream client, wherein the first window is accessing the data stream, is not visible; and
in response to the determination that the first window is not visible, sending, from the data stream client to the data stream server, a second pause request to temporarily halt the data stream.

10. The method of claim 9, further comprising
after determining that the first window of the data stream client is not visible, determining that the first window of the data stream client is visible;
in response to the determination that the first window is visible, sending a second resume request to the data stream server; and
receiving, at the data stream client and from the data stream server, the data stream.

11. The method of claim 1 further comprising transitioning, by the data stream client, from a first power state to a decreased power consumption state in response to receipt of the power management decrease event, wherein the data stream client consumes lesser power in the decreased power consumption state than in the first power state.

12. The method of claim 11, wherein the decreased power consumption state is one of the following:
a sleeping state, such as a sleep state, a hibernating state, a standby state, or a suspend state; or
a soft off state or an off state.

13. The method of claim 11, further comprising transitioning, by the data stream client, from the decreased power consumption state to the first power state in response to receipt of the power management increase event.

14. The method of claim 11, wherein a temporal relationship between the power management decrease event and the transition from the first power state to the decreased power consumption state is defined according to an operating system of the data stream client.

15. An apparatus for controlling a data stream from a server computer, the apparatus comprising hardware operable to:
receive the data stream from the data stream server during a data transmission session;
transition to a decreased power consumption state;
send, to the data stream server, a pause request to temporarily halt transmission of the data stream in response to detection of the transition;
subsequently, transition out of the decreased power consumption state;
send, to the data stream server, a first resume request in response to the transition out of the decreased power consumption state being before the data transmission session of the data stream is ended; and
send, to the data stream server, a second resume request in response to the transition out of the decreased power consumption state being after the data transmission session of the data stream is ended, the second resume request comprising a request to setup a new data transmission session and an indication of where the data stream was paused at the time of the first pause request.

16. The apparatus of claim 15, wherein the hardware is further operable to generate a first power management event in response to the transition to the decreased power consumption state and generate a second power management event in response to the transition out of the decreased power consumption state, the power management events indicative of the respective transition.

17. A non-transitory storage medium comprising computer executable instructions, the non-transitory storage medium comprising:
instructions to receive a data stream at a data stream client from a remote computer;
instructions to detect transition of the data stream client to a decreased power consumption state;
instructions to send a request to pause transmission of the data stream from the remote computer;
instructions to detect transition of the data stream client out of the decreased power consumption state;
instructions to send a first resume request in response to the transition out of the decreased power consumption state being before a data transmission session of the data stream has ended; and
instructions to send a second resume request in response to the transition out of the decreased power consumption state being after the data transmission session of the data stream has ended, the second resume request comprising a request to setup a new data transmission session at the remote computer and an indication of where the data stream was paused at the time of the first pause request.

18. The non-transitory storage medium of claim 17 further comprising instructions to transition the data stream client to the decreased power consumption state in response to a user interface window corresponding to the data stream is reordered.

* * * * *